United States Patent
Kolloch et al.

(10) Patent No.: US 12,196,961 B2
(45) Date of Patent: Jan. 14, 2025

(54) HEAD-UP DISPLAY WITH EXACTLY ALIGNED OPTICAL WAVEGUIDES

(71) Applicant: Continental Automotive GmbH, Hannover (DE)

(72) Inventors: Ulrich Kolloch, Seligenstadt (DE); Willi Scheffler-Juschtschenko, Großostheim (DE); Felicitas Wille, Darmstadt (DE); Ferenc Markus, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 955 days.

(21) Appl. No.: 17/120,793

(22) Filed: Dec. 14, 2020

(65) Prior Publication Data

US 2021/0096366 A1    Apr. 1, 2021

Related U.S. Application Data

(63) Continuation of application No. PCT/EP2019/065535, filed on Jun. 13, 2019.

(30) Foreign Application Priority Data

Jun. 15, 2018    (EP) .................................... 18465536

(51) Int. Cl.
*G02B 27/01*    (2006.01)

(52) U.S. Cl.
CPC .. *G02B 27/0103* (2013.01); *G02B 2027/0198* (2013.01)

(58) Field of Classification Search
None
See application file for complete search history.

(56) References Cited

U.S. PATENT DOCUMENTS

| | | | |
|---|---|---|---|
| 2006/0291771 | A1 | 12/2006 | Braunisch et al. |
| 2008/0304802 | A1 | 12/2008 | Watanabe et al. |
| (Continued) | | | |

FOREIGN PATENT DOCUMENTS

| | | |
|---|---|---|
| CN | 101271175 A | 9/2008 |
| CN | 101650452 A | 2/2010 |
| (Continued) | | |

OTHER PUBLICATIONS

Office Action (translated and original) dated Jan. 20, 2022 from corresponding Chinese patent application No. 201980035501.4.

(Continued)

*Primary Examiner* — Bao-Luan Q Le
*Assistant Examiner* — Danell L Owens

(57) ABSTRACT

A method for exactly aligning at least two holograms arranged in optical waveguides with respect to one another includes writing a first hologram and a first mark in a first optical waveguide. The method also includes writing a second hologram and a second mark in a second optical waveguide. The method further includes positioning the first optical waveguide and the second optical waveguide with respect to one another. The method also includes illuminating the first mark and the second mark. A pattern occurring during the illumination after passing the first mark and the second mark is detected. The method further includes changing the position of one of the optical waveguides until the detected pattern matches a specified pattern.

8 Claims, 9 Drawing Sheets

(56) References Cited

U.S. PATENT DOCUMENTS

| | | |
|---|---|---|
| 2010/0040337 A1 | 2/2010 | Suzuki et al. |
| 2012/0195562 A1 | 8/2012 | Tsujita et al. |
| 2012/0281943 A1 | 11/2012 | Popovich et al. |
| 2014/0140653 A1 | 5/2014 | Brown et al. |
| 2014/0140654 A1 | 5/2014 | Brown et al. |
| 2016/0004090 A1 | 1/2016 | Popovich et al. |
| 2016/0124223 A1 | 5/2016 | Shinbo et al. |
| 2017/0094265 A1 | 3/2017 | Mullins et al. |
| 2017/0299860 A1 | 10/2017 | Wall et al. |
| 2019/0146221 A1* | 5/2019 | Oku ............... G02B 27/0172 359/13 |

FOREIGN PATENT DOCUMENTS

| | | | |
|---|---|---|---|
| CN | 102621631 A | 8/2012 | |
| CN | 103823267 A | 5/2014 | |
| CN | 105403967 A | 3/2016 | |
| CN | 107003528 A | 8/2017 | |
| EP | 1367415 A2 * | 12/2003 | ............ G02B 27/32 |
| EP | 3226063 A1 | 5/2018 | |
| TW | 201411212 A | 3/2014 | |

OTHER PUBLICATIONS

First Search (translated and original) dated Nov. 25, 2021 from corresponding Chinese patent application No. 201980035501.4.
International Search Report and Written Opinion dated Oct. 2, 2019 from corresponding International Patent Application No. PCT/EP2019/065535.
Communication pursuant to Article 94 (3) EPC dated Aug. 30, 2023 corresponding to European Application No. 19729768.2.

\* cited by examiner

HEAD-UP DISPLAY WITH EXACTLY ALIGNED OPTICAL WAVEGUIDES

CROSS REFERENCE TO RELATED APPLICATION

This application is a continuation of International application No. PCT/EP2019/065535, filed Jun. 13, 2019, which claims priority to European patent application No. 18465536.3, filed Jun. 15, 2018, each of which is hereby incorporated by reference.

TECHNICAL FIELD

The technical field relates generally to a head-up display with optical waveguides and a method for alignment of the optical waveguides.

BACKGROUND

US 2016/0124223 A1 discloses a head-up display with an optical waveguide. If a colored virtual image is to be produced therewith, at least two optical waveguides for different colors are required. These should be aligned as exactly as possible with respect to one another to ensure a good color impression.

As such, it is desirable to present a method for alignment of the optical waveguides. In addition, other desirable features and characteristics will become apparent from the subsequent summary and detailed description, and the appended claims, taken in conjunction with the accompanying drawings and this background.

SUMMARY

In one embodiment, a method for exactly aligning at least two holograms arranged in optical waveguides with respect to one another, includes writing a first hologram and a first mark in a first optical waveguide. The method also includes writing a second hologram and a second mark in a second optical waveguide. The method further includes positioning the first optical waveguide and the second optical waveguide with respect to one another. The method also includes illuminating the first mark and the second mark. A pattern occurring during the illumination after passing the first mark and the second mark is detected. The method further includes changing the position of one of the optical waveguides until the detected pattern matches a specified pattern.

At least one of the marks may be written in the same material in which the associated hologram is also written. This may be done by the hologram and the mark being exposed and fixed at the same time. According to one variant, the hologram and mark are exposed in succession. The mark is produced, for example, by burning-in with the introduction of a large amount of energy.

According to one variant, at least one of the marks is written in a material different from that in which the associated hologram is written. The mark may be applied as a material that is not transmissive to light next to the hologram in its plane or onto the layer in which the hologram is located.

When correctly positioned, the marks of the individual optical waveguides may lie exactly on top of one another and produce a detectable pattern during the illumination.

According to one variant, the marks of the individual optical waveguides lie next to one another when correctly positioned and produce a detectable pattern during the illumination. In this pattern, portions originating from the different marks are located preferably separately next to one another and can thus be detected separately.

According to a another variant, the marks of the individual optical waveguides are grating structures or holograms that influence the light used during the illumination and are adapted to one another in such a way that a correct alignment is detectable.

In one embodiment, a central region of the mark allows light to pass, while an outer region located outside the central region strongly deflects light to the outside. The detected pattern is therefore bright only when the central regions of all marks lying on top of one another are struck by the light beam, that is to say exact positioning is achieved.

According to a another variant, the marks have a lens function. The focal lengths are selected here such that a correct pattern occurs only when the distance between the individual optical waveguides also takes a specified value. Exact positioning is thus not only made possible two-dimensionally in the plane, but also in the third dimension.

Different marks may be arranged at different positions of the optical waveguides. This has the advantage that a combination of different patterns to be evaluated makes even more exact positioning possible.

According to one embodiment, a stack of optical waveguides may be produced by a method as set forth herein.

A head-up display may be implemented with such a stack of optical waveguides.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
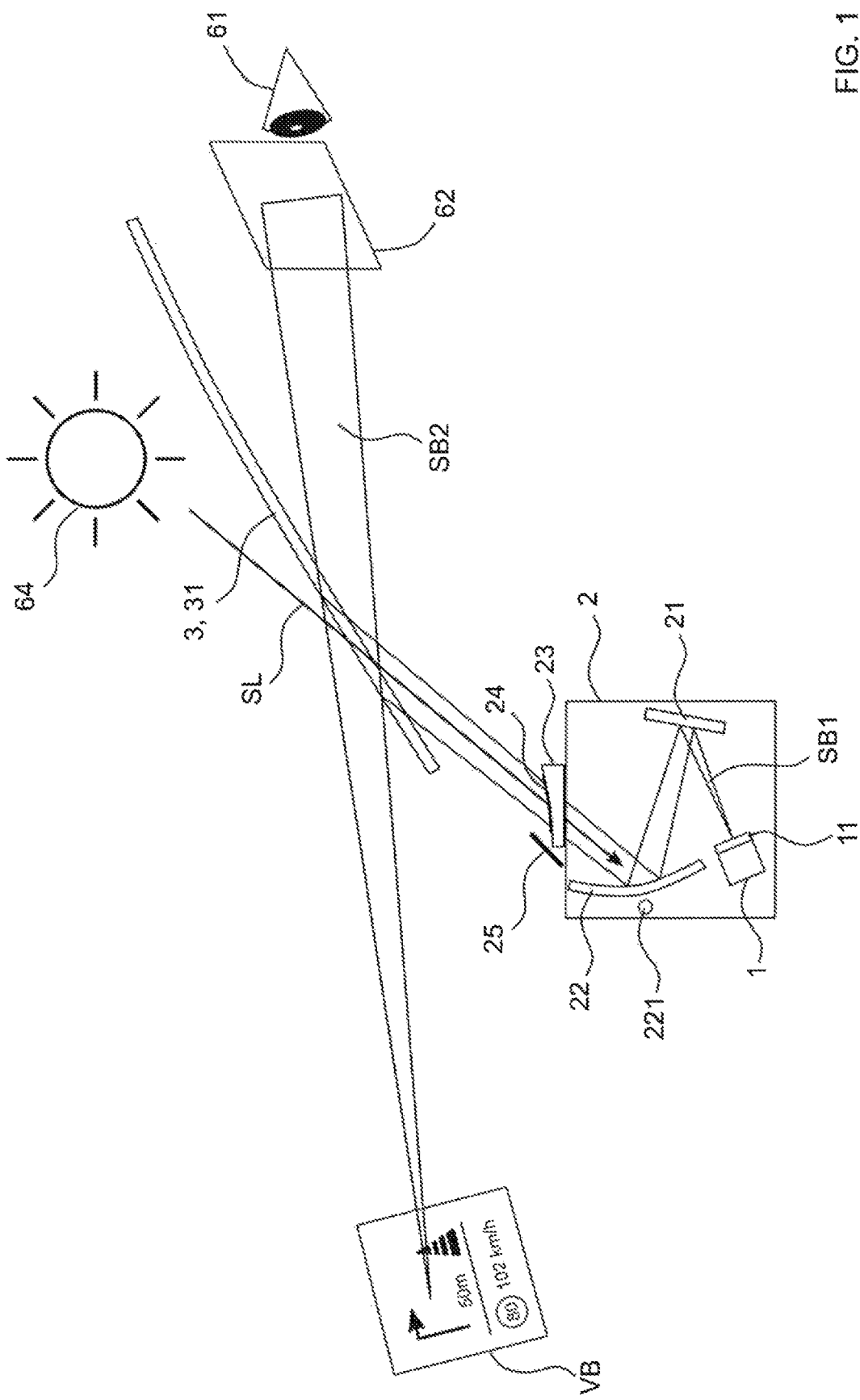
FIG. 1 is a schematic representation of a head-up display according to the prior art.

FIG. 1 shows a schematic diagram of a head-up display according to the prior art. It has an image generator 1, an optics unit 2, and a mirror unit 3. A beam bundle SB1 emanates from a display element 11 and is reflected by a folding mirror 21 onto a curved mirror 22 that reflects it in the direction of the mirror unit 3, which is shown here as the windshield 31 of a vehicle. From there, the beam bundle SB2 travels in the direction of the eye 61 of a viewer. The viewer sees a virtual image VB that is located outside the vehicle above the engine hood or even in front of the vehicle. Due to the interaction of the optics unit 2 and the mirror unit 3, the virtual image VB is an enlarged representation of the image displayed by the display element 11. A speed limit, the current vehicle speed, and navigation instructions are symbolically represented here. As long as the eye 61 is located within the eyebox 62 indicated by a rectangle, all elements of the virtual image are visible to that eye 61. If the eye 61 is outside the eyebox 62, the virtual image VB is only partially visible to the viewer, or not visible at all. The larger the eyebox 62 is, the less restricted the viewer is when choosing their seating position.

The curvature of the curved mirror 22 serves to prepare the beam path and thus to ensure a larger image and a larger eyebox 62. In addition, the curvature compensates for a curvature of the windshield 31, with the result that the virtual image VB corresponds to an enlarged reproduction of the image represented by the display element 11. The curved mirror 22 is rotatably mounted by means of a bearing 221. The rotation of the curved mirror 22 that is made possible thereby makes it possible to displace the eyebox 62 and thus to adapt the position of the eyebox 62 to the position of the eye 61. The folding mirror 21 serves to ensure that the path traveled by the beam bundle SB1 between the display element 11 and the curved mirror 22 is long and, at the same time, that the optics unit 2 is nevertheless compact. The optics unit 2 is delimited with respect to the environment by a transparent cover 23. The optical elements of the optics unit 2 are thus protected for example against dust located in the interior of the vehicle. An optical film 24 that is intended to prevent incident sunlight SL from reaching the display element 11 via the mirrors 21,22 is situated on the cover 23. Said display element may be temporarily or permanently damaged by the resulting development of heat. In order to prevent this, an infrared component of the sunlight SL is filtered out for example by means of the optical film 24. Anti-glare protection 25 serves to block incident light from the front so that it is not reflected by the cover 23 in the direction of the windshield 31, which would cause the viewer to be dazzled. In addition to the sunlight SL, the light from another stray light source 64 may also reach the display element 11.

The same reference signs are also used in the following figures for identical or functionally identical elements and are not necessarily described again for each figure.

Figure 2:
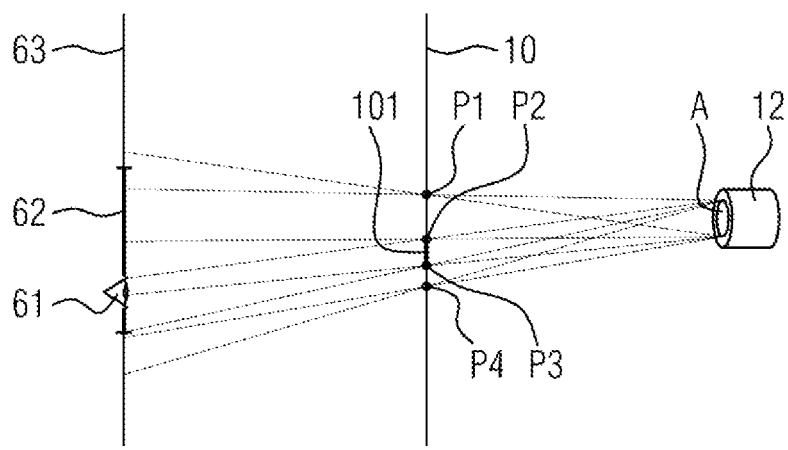
FIG. 2 is a schematic representation of a beam path according to one exemplary embodiment.
Figure 3:
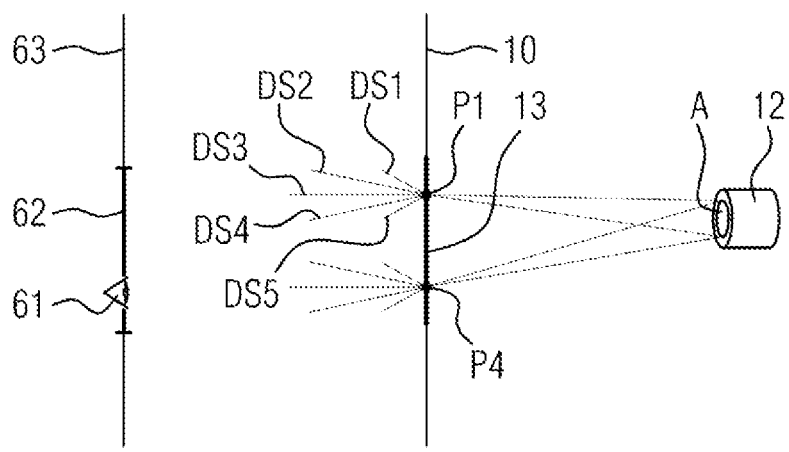
FIG. 3 is a schematic representation of a beam path with a diffuser according to one exemplary embodiment.
Figure 4:
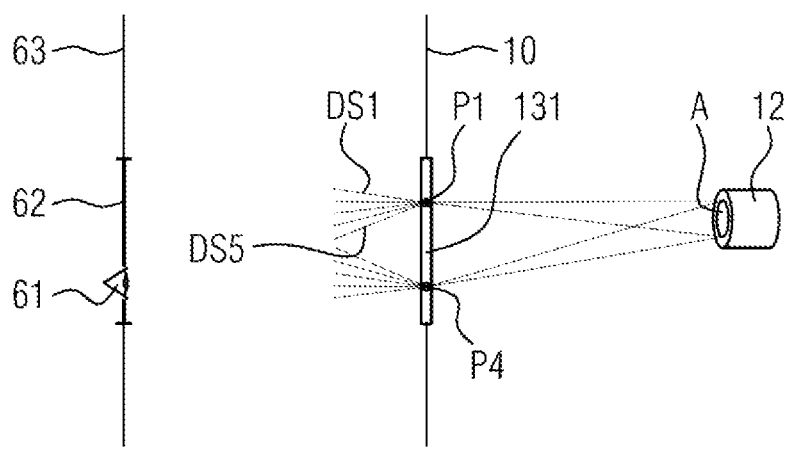
FIG. 4 is a schematic representation of a beam path with a directed diffuser according to one exemplary embodiment.

FIGS. 2-4 show a simplified schematic beam path in a head-up display. The various reflections are omitted for the sake of clarity. The eye 61 can be seen on the left, the image plane 10 that corresponds to both the display element 11 and the virtual image VB can be seen in the middle, and on the right is the aperture A of an image-generating device 12, which is for example a spatial light modulator, also called SLM. An SLM is used to spatially modulate light. This can be done in a variety of ways. A special type of SLM is a DMD projector, where DMD stands for "Digital Micromirror Device." This is a device in which either a single micromirror movable in the X- and Y-directions scans a laser beam over an image area or in which the image area is formed by a multiplicity of micromirrors that are arranged next to one another to form a surface and illuminated by a light source. The eyebox 62 is indicated in the viewing plane 63 by means of a reinforced line and a demarcation at the top and bottom.

FIG. 2 shows points P1 to P4 in the image plane 10. It can be seen that, due to its position in the image plane 10 and the size of the aperture A, the point P1 is visible only from parts of the eyebox 62. The point P4 is visible only outside the eyebox 62. Only the points P2 and P3 are visible in the eyebox 62; beams emanating therefrom also fall into the eye 61. Thus, only a small region 101 of the image plane 10 can be captured by the eye 61 in the position thereof shown.

FIG. 3 shows the same arrangement as FIG. 2, but with a diffuser 13 arranged in the image plane 10. This ensures that light coming from the image-generating device 12 is diffusely scattered. This is indicated at points P1 and P4 by means of diffusely scattered beams DS1-DS5, the directions of which indicate the directions in which diffuse scattering occurs, and whose lengths indicate the intensity in the corresponding directions. It can be seen that the greatest intensity travels in the center of the corresponding beam bundle shown in FIG. 2, here illustrated by the diffusely scattered beam DS3. The greater the angles of the other beams DS1, DS2, DS4, DS5 are to the beam DS3, the lower their intensities. It can be seen that the beam DS5 reached the eye 61 from point P1. The diffusely scattered beams DS3 and DS4 continue to fall into the eyebox 62, while the beams DS1 and DS2 lie outside and are thus lost. Similar is true for point P4.

FIG. 4 shows the same arrangement as FIG. 3, but with a diffuser 131, which has a special diffusion characteristic. It can be seen that all the diffusely scattered beams DS1 to DS5 emanating from point P1 have approximately the same intensity, and their angular distribution is such that they all enter the eyebox 62. A loss of light therefore does not occur at this point.

Figure 5:
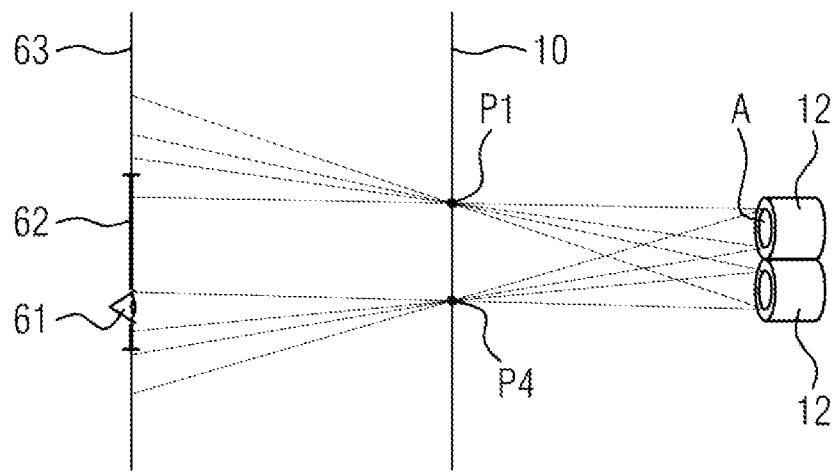
FIG. 5 is a schematic representation of a beam path with a plurality of image-generating devices according to one exemplary embodiment.

FIG. 5 shows an arrangement similar to that of the preceding figures, but in this case with a plurality of image-generating devices 12. The image-generating devices 12 are adapted with respect to one another in such a way that light beams are emitted in a larger angle range at points P1 and P4, as a result of which point P4 is also visible from the eyebox 62. By increasing the number of image-generating devices 12, an effect similar to that achieved by means of a diffuser 13 regarding the visibility of points P1 to P4 in the entire eyebox 62 is achieved.

Figure 6:
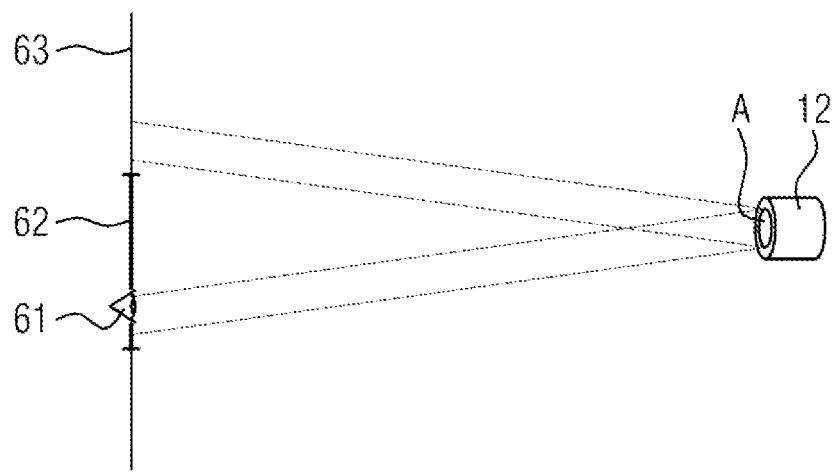
FIG. 6 is a schematic representation of a beam path with image at infinity according to one exemplary embodiment.

FIG. 6 shows an arrangement similar to that of the preceding figures, but in this case the image-generating device 12 does not focus at an image plane, but rather collimates to infinity. The beams arriving at a point in the viewing plane 63 each travel parallel to one another. Rather than arranging a plurality of image-generating devices 12 that are adapted with respect to one another, as shown in FIG. 5, this makes it possible to virtually double the one image-generating device 12. This is shown in the following figures.

Figure 7:
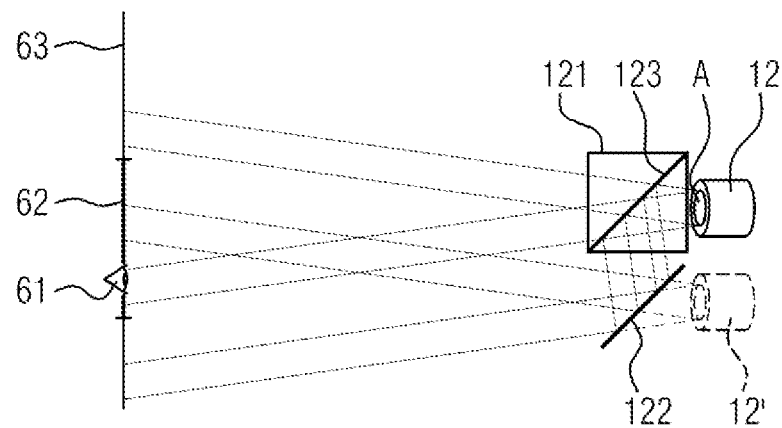
FIG. 7 is a schematic representation of a beam path with virtual doubling according to one exemplary embodiment.

FIG. 7 shows an arrangement similar to FIG. 6, but in this case with virtual doubling of the image-generating device 12. For this purpose, a beam splitter that reflects part of the radiation onto a mirror 122 is arranged in the beam path of the image-generating device 12. The mirror plane 123 of the beam splitter 121 is aligned such that it is parallel to the mirror 122. The number of parallel beam bundles emanating from the image-generating device 12, two of which are shown here, is doubled and their respective intensity is halved. Both of the beam bundles shown are thus incident in the eyebox 62. The virtual image-generating device 12' is indicated by dashed lines. A suitable arrangement of further beam splitters and suitable adaptation of their sizes can ensure that beam bundles can be viewed over a large angle range from any point of the eyebox 62 when the eye 61 is located there.

Figure 8:
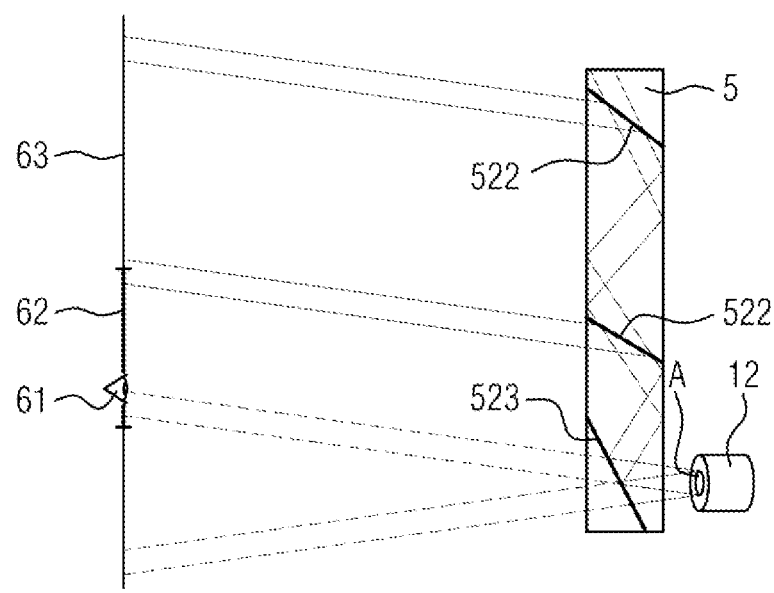
FIG. 8 is a schematic representation of a beam path with an optical waveguide according to one exemplary embodiment.

FIG. 8 shows an arrangement similar to FIG. 7. However, the beam splitter 121 and the mirror 122 are replaced in this case by an optical waveguide 5. The optical waveguide 5 has a mirror plane 523 with which light coming from the image-generating device 12 is coupled into the optical waveguide 5. The extension of the original beam direction is indicated by dashed lines. The light that is coupled into the optical waveguide 5 undergoes total internal reflection at the interfaces thereof and is thus guided within the optical waveguide 5. The optical waveguide 5 furthermore has mirror planes 522 that are partially transmissive and in each case couple a part of the light that is incident thereon out of the optical waveguide 5. For the sake of clarity, this is shown with the parallel beam bundle at only one angle. The principle of multiplying the parallel beam bundles can be seen. A sufficiently uniform illumination of the eyebox 62 can be achieved owing to a suitable arrangement. The coupling-in and the coupling-out can take place by means of diffraction gratings (not shown here) arranged on the surface of the optical waveguide 5 or in another manner familiar to a person skilled in the art rather than by means of mirror planes 522,523.

Figure 9:
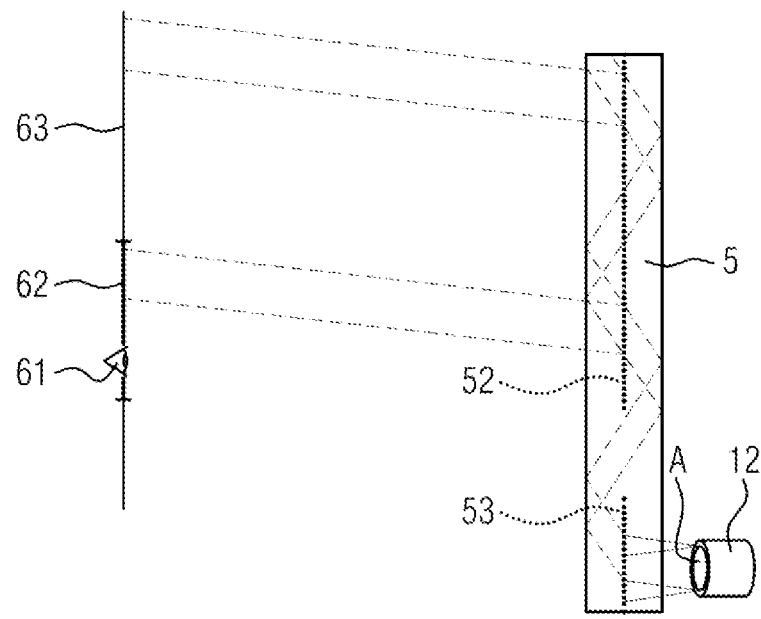
FIG. 9 is a schematic representation of a beam path with an optical waveguide according to one exemplary embodiment.

FIG. 9 shows an arrangement similar to FIG. 8, but in this case the optical waveguide 5 has an input coupling hologram 53 and an output coupling hologram 52, which are arranged as volume holograms in the center of the optical waveguide 5. Here, too, only the principle is indicated. It is to be understood that a suitable choice of the holograms can ensure that the entire eyebox 62 is uniformly illuminated with parallel beam bundles at all desired angles.

Figure 10:
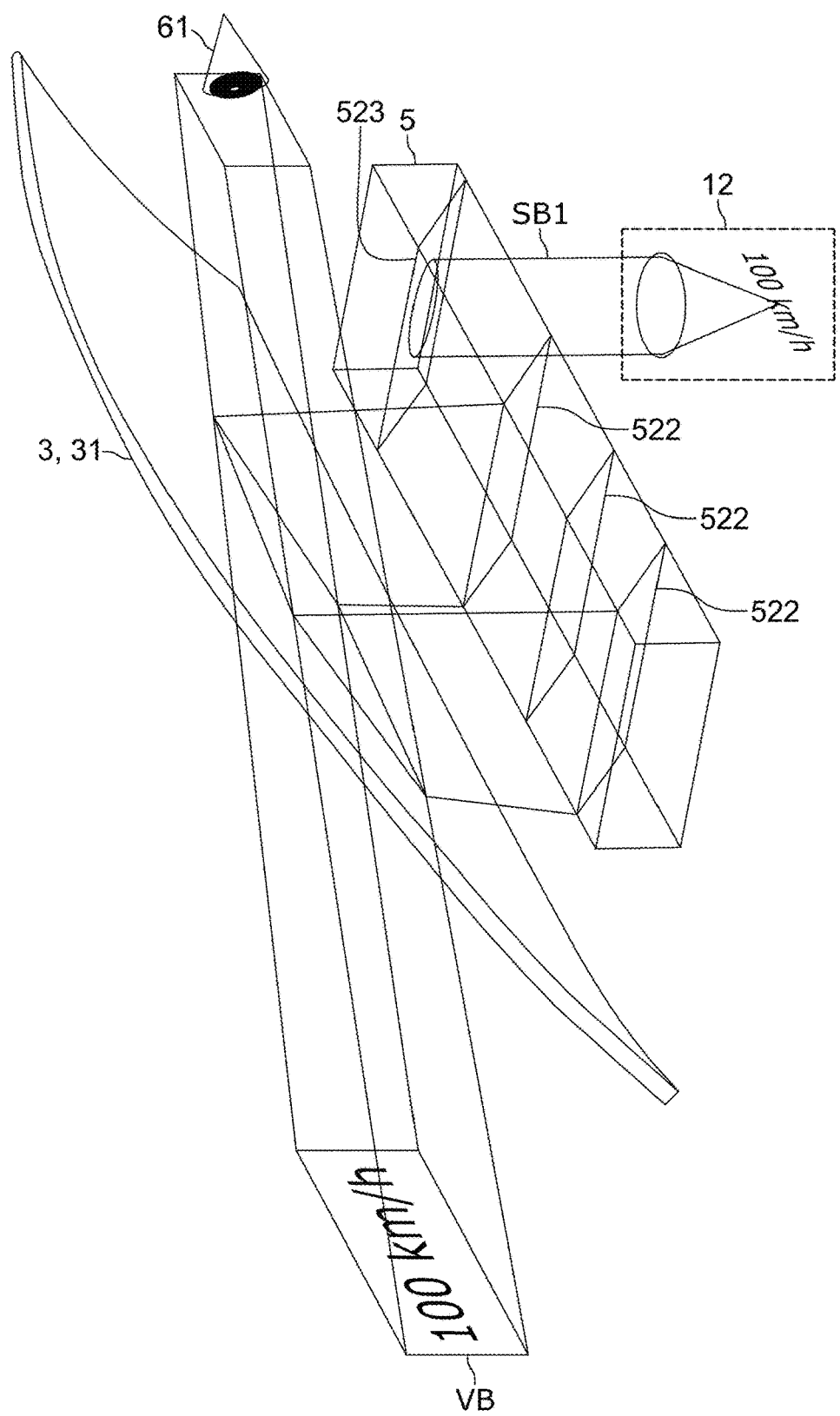
FIG. 10 is a schematic representation of a head-up display with an optical waveguide according to one exemplary embodiment.

FIG. 10 shows a head-up display similar to FIG. 1, except in this case in a three-dimensional illustration and with an optical waveguide 5. It shows the schematically indicated image-generating device 12, which produces a parallel beam bundle SB1 that is coupled into the optical waveguide 5 by means of the mirror plane 523. A plurality of mirror planes 522 each reflect a portion of the light incident on them in the direction of the windshield 31, the mirror unit 3. The light is reflected by the latter in the direction of the eye 61, which sees a virtual image VB above the engine hood or at an even further distance in front of the vehicle.

Figure 11:
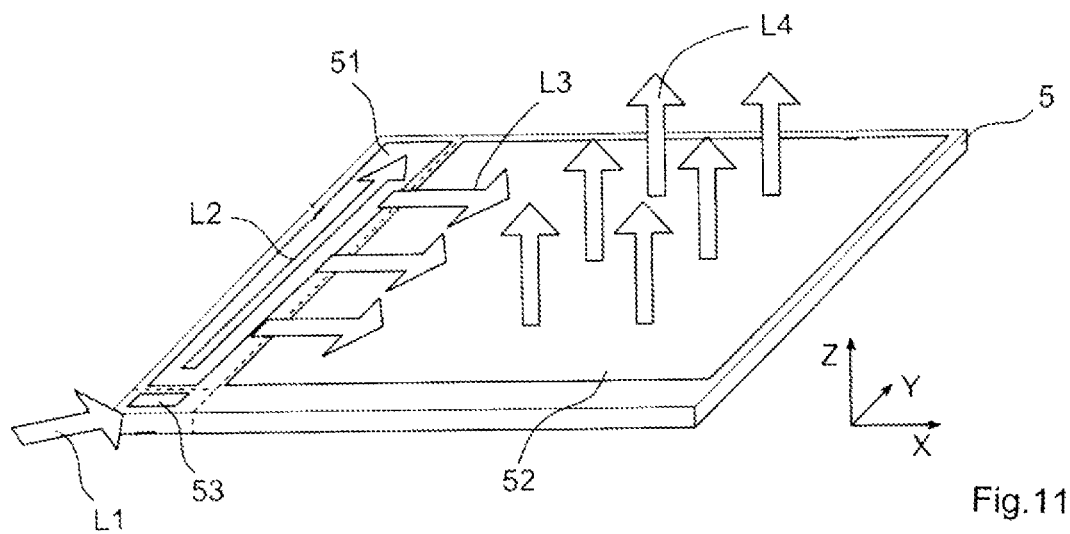
FIG. 11 is a schematic representation of a optical waveguide with two-dimensional enlargement according to one exemplary embodiment.

FIG. 11 shows a schematic spatial illustration of an optical waveguide 5 with two-dimensional enlargement. In the lower left region, an input coupling hologram 53 can be seen, by means of which light L1 coming from an image-generating device 12 (not shown) is coupled into the optical waveguide 5. Said light propagates therein in the drawing to the top right, corresponding to the arrow L2. In this region of the optical waveguide 5, a folding hologram 51 that acts similarly to many partially transmissive mirrors arranged one behind the other and produces a light bundle that is expanded in the Y-direction and propagates in the X-direction is located. This is indicated by three arrows L3. In the part of the optical waveguide 5 that extends to the right in the figure, an output coupling hologram 52 is located, which likewise acts similarly to many partially transmissive mirrors arranged one behind the other and, indicated by arrows L4, couples light upward in the Z-direction out of the optical waveguide 5. In this case, an expansion takes place in the X-direction, so that the original incident light bundle L1 leaves the optical waveguide 5 as a light bundle L4 that is enlarged in two dimensions. The optical waveguide 5 has a first optical waveguide 510 that expands in the y-direction and has the folding hologram 51, a second optical waveguide 520 that widens in the x-direction and has the output coupling hologram 52, and a third optical waveguide 530 that has the input coupling hologram 53.

Figure 12:
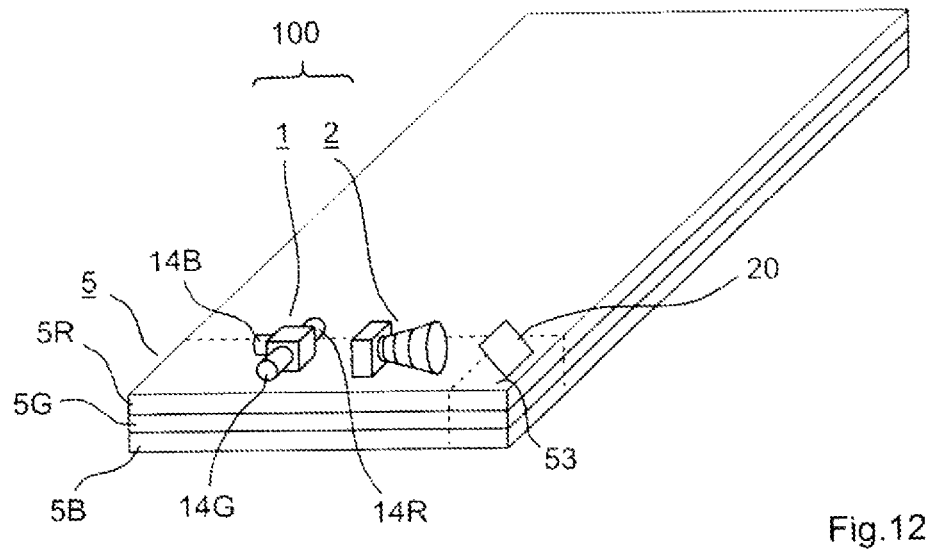
FIG. 12 is a schematic representation of a head-up display with optical waveguide according to one exemplary embodiment.

FIG. 12 shows a three-dimensional illustration of a head-up display with three optical waveguides 5R, 5G, 5B, which are arranged one above the other and each stand for an elementary color red, green, and blue. Together they form the optical waveguide 5. The holograms 51, 52, 53 present in the optical waveguides 5 are wavelength-dependent, meaning that one optical waveguide 5R, 5G, 5B is used in each case for one of the elementary colors. An image generator 1 and an optics unit 2 are shown above the optical waveguide 5. Both together are often referred to as the image-generating unit or PGU (picture-generating unit) 100. The optics unit 2 has a mirror 20, by means of which the light produced by the image generator 1 and shaped by the optics unit 2 is deflected in the direction of the respective input coupling hologram 53. The image generator 1 has three light sources 14R, 14G, 14B for the three elementary colors. It can be seen that the entire unit shown has a small overall structural height compared to its light-emitting surface.

Figure 13:
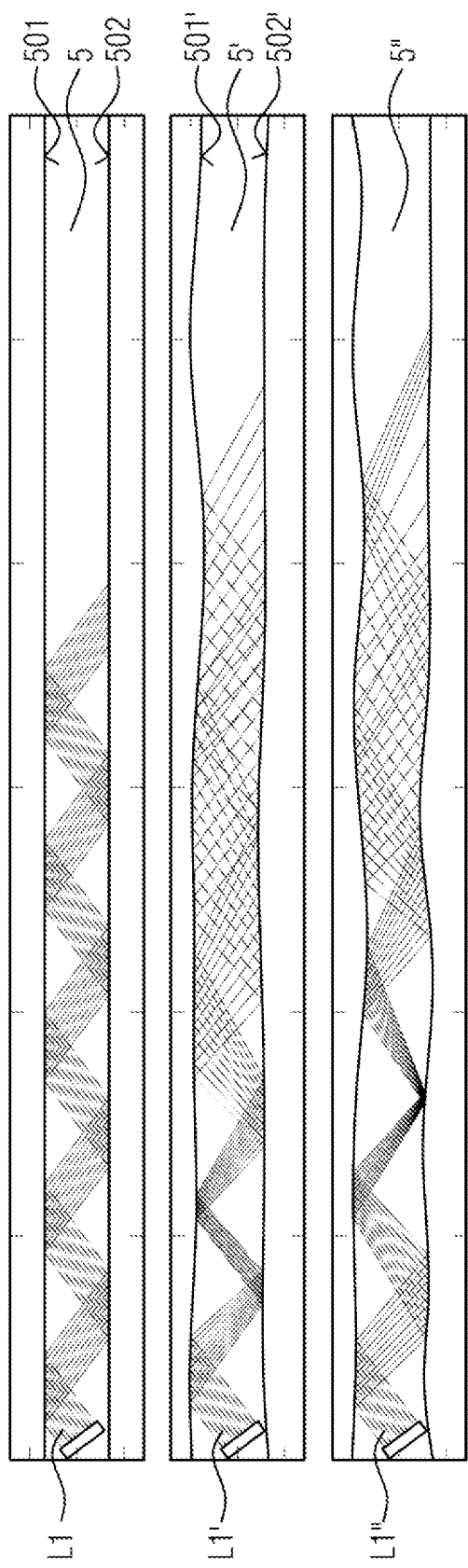
FIG. 13 is a schematic representation of a optical waveguide in longitudinal section according to one exemplary embodiment.

FIG. 13 shows three optical waveguides 5 in longitudinal section. The upper optical waveguide 5 has an ideally flat upper boundary surface 501 and an ideally flat lower boundary surface 502, both of which are arranged parallel to one another. It can be seen that a parallel light bundle L1 propagating from left to right in the optical waveguide 5 remains unchanged and parallel in cross section owing to the parallelism and flatness of the upper and lower boundary surfaces 501,502. The middle optical waveguide 5' has upper and lower boundary surfaces 501',502' that are not completely flat and also not at least regionally parallel to one another. The optical waveguide 5' thus has a thickness that varies in the light propagation direction. It can be seen that the light bundle L1' is no longer parallel after just a few reflections and also does not have a homogeneous cross section. The lower optical waveguide 5" has upper and lower boundary surfaces 501", 502" that deviate even more strongly from the ideal shape than the two upper ones. The light bundle L1" therefore likewise deviates even more strongly from the ideal shape.

Figure 14:
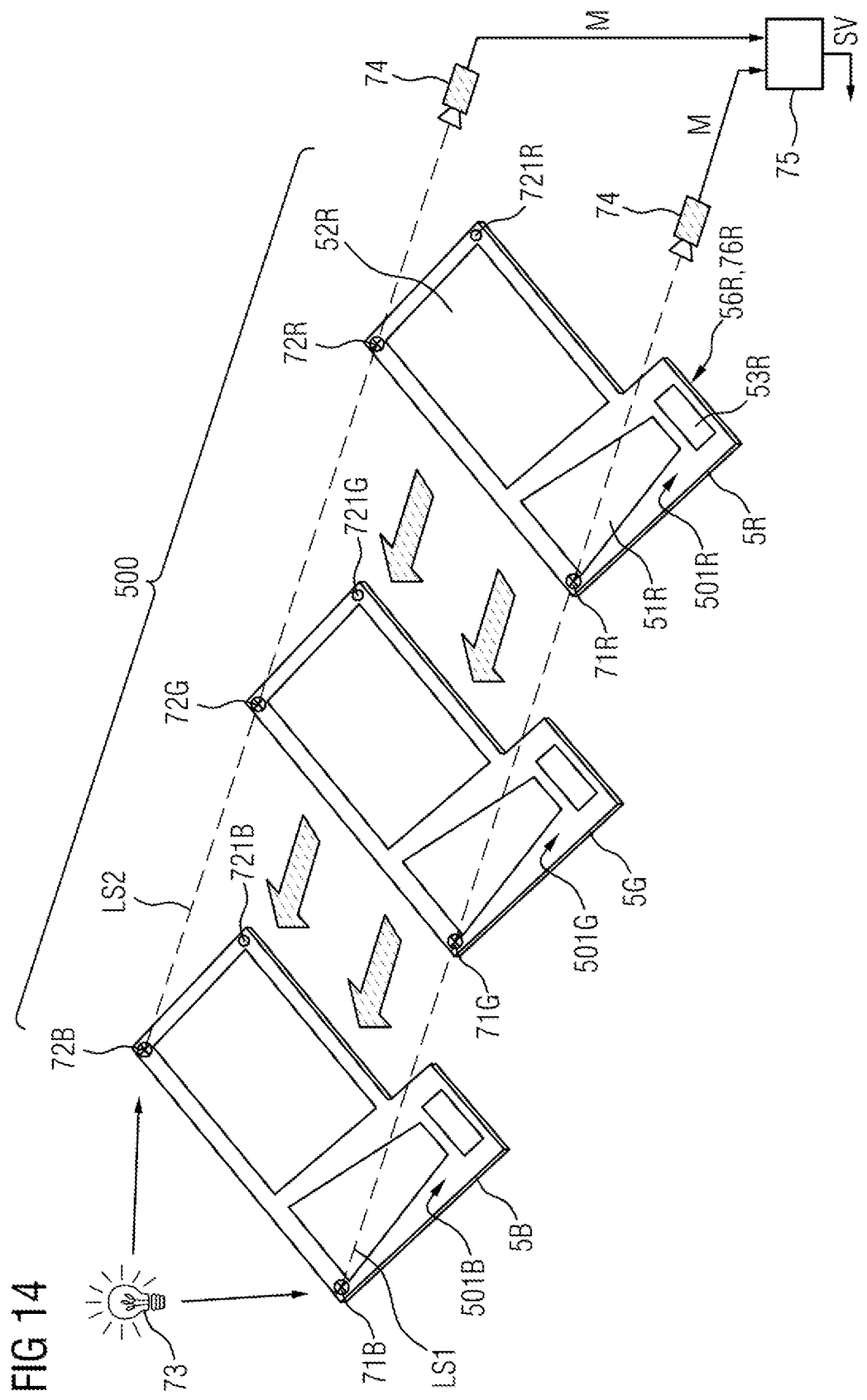
FIG. 14 is a schematic representation of a stack of optical waveguides and their production according to one exemplary embodiment.

FIG. 14 shows a stack 500 according to the invention of optical waveguides 5, 5R, 5G, 5B for a head-up display and its production. In these, the input coupling holograms 53R, 53G, 53B, the folding holograms 51R, 51G, 51B, and the output coupling holograms 52R, 52G, 52B are each located on the upper boundary surface 501R, 501G, 501B. Marks 71R, 71G, 71B and 72R, 72G, 72B are also located there, which are arranged here in the corners located on the longest straight edge of the optical waveguide 5R, 5G, 5B. A light source 73 can be seen on the far left in the figure and is shown here schematically as a light bulb. The light source is advantageously a laser that emits light beams LS1, LS2 that pass the marks 71R, 71G, 71B or 72R, 72G, 72B and are detected by light detectors 74. The latter can be simple light detector cells, but preferably two-dimensional detector arrangements with a plurality of rows and columns of light detectors for recognizing patterns are provided.

In the case of a stack 500 of optical waveguides 5,5R,5G, and/or 5B, each of the optical waveguides 5R,5G, or 5B has at least one hologram 51R,52R, 53R, 51G,52G,53G, or 51B,52B,53B, and each of the optical waveguides 5R,5G, and 5B has at least one mark 71R,72R,721R, 71G,72G, 721G, or 71B,72B,721B. Mutually associated marks 71R, 71G,71B, 72R,72G,72B, or 721R,721G,721B of the individual optical waveguides 5R,5G, and 5B are arranged aligned with respect to one another following the production according to the invention.

Figure 15:
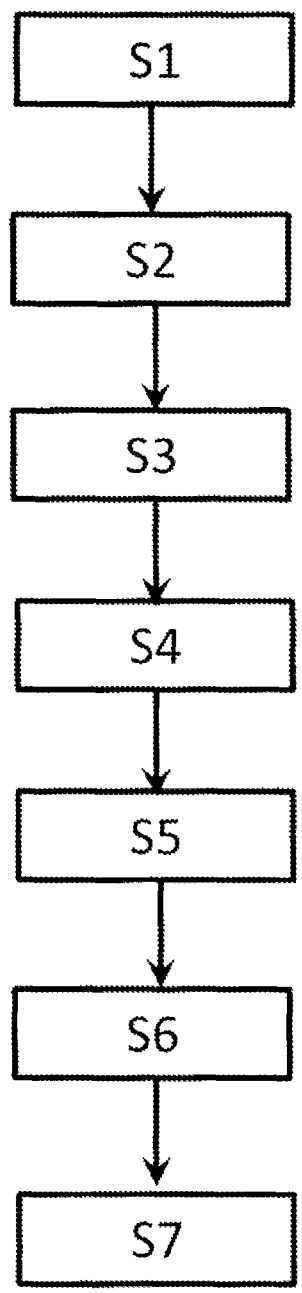
FIG. 15 is flowchart of a method according to one exemplary embodiment.

FIG. 15 shows a flowchart of a method according to the invention. The first holograms 51R, 52R and 53R of a first optical waveguide 5R and its two marks 71R,72R are written at S1. This is preferably done by exposing a liquid material 76R, which in the cured state forms the hologram layer 56R. At S2, writing in the second optical waveguide 5G is effected accordingly, and, at S3, writing in the third optical waveguide 5B is effected. At S4, the optical waveguides 5R, 5G, 5B are roughly positioned relative to one another. At S5, the marks 71R,71G,71B, 72R,72G,72B are illuminated by the light beams LS1, LS2. At S6, the pattern M occurring after the marks have been passed is detected in the respective light detector 74 and fed to a control unit 75. The latter outputs a signal SV to a positioning device (not shown here) that, at S7, finely positions the position of the optical waveguides 5R,5G,5B with respect to one another until the detected pattern M corresponds to a specified pattern. Additionally, or alternatively, a mark 721R, 721G, 721B is applied by means of a material 761, which differs from material 76, here black color. The associated light source, detector, and light beam are not shown here for the sake of clarity. The marks 721R,721G,721B are shown here arranged one above the other. A combination of one or two marks 71,72 of the material 76 and two or one mark 721 of the different material 761 is also useful, but is not shown here.

In other words, the disclosure relates to the correct alignment of the output coupling holograms 52. In the case of the folding hologram 51 and even more so in the case of the input coupling hologram 53, good alignment is desirable, but not absolutely necessary. A full-color optical waveguide head-up display, also referred to as a full-color waveguide head-up display, consists of three monochrome optical waveguides 5R,5G,5B for the colors red, green, and blue. In order to be able to use the full scope of the optical compensation possibilities, it is necessary to position the three individual optical waveguides 5R,5G,5B exactly with respect to one another. This is realized, for example, by way of mechanical stops. A suitable measurement technique for the alignment is not yet available. One problem is that, if the three optical waveguides 5R,5G,5B lying one on top of another are not exactly aligned with respect to one another, existing optical compensation possibilities cannot be used. The accuracies that have been achieved up to now often lead to distortions or color shifts. According to the invention, an alignment concept is proposed for the individual optical waveguides 5R,5G,5B that are arranged one above the other.

In order to ensure the most exact alignment possible of the individual monochrome optical waveguides 5R,5G,5B with respect to one another, marks 71,72 that in turn are situated very exactly with respect to the holograms 51,52,53 present in the optical waveguides 5R,5G,5B and are positioned such that they lie exactly one above the other in the correctly aligned state, are also introduced during the exposure process for producing the grating structures, the holograms 51,52, and 53. During the alignment process, the optical waveguides 5R,5G,5B are illuminated from below and the marks are detected by means of the light detector 74, for example a suitable camera. When the optical waveguides 5R,5G,5B are in a correct position, they are fixed in that position.

By introducing the marks 71,72 in the individual optical waveguides 5R, 5G, 5B during and together with the production of the grating structures, of the holograms 51,52,53, the marks 71,72 are positioned very easily and highly precisely with respect to the respective hologram 51,52,53. The subsequent process of aligning the different optical waveguides 5R,5G,5B with respect to one another is also carried out very easily and precisely by means of camera recognition. As a result of the very precise alignment of the three individual optical waveguides 5R,5G,5B, the full optical performance in the sense of optical compensation possibilities can be used for compensating various curvatures of windshields 31.

Further details can be found in the claims or the introduction to the description. It is to be understood that the measures specified can also be used according to the invention in a modification or in a combination other than those described here.

What is claimed is:

1. A method for exactly aligning at least two holograms arranged in optical waveguides with respect to one another, said method comprising:
    writing a first hologram and a first mark in a first optical waveguide for a first color;
    writing a second hologram and a second mark in a second optical waveguide for a second color, wherein the first color and the second color are not the same;
    positioning the first optical waveguide and the second optical waveguide with respect to one another;
    illuminating the first mark and the second mark, wherein the marks of the individual optical waveguides are grating structures or holograms that influence the light used during the illumination and are adapted to one another in such a way that a correct alignment is detectable, wherein a central region of the mark allows light to pass while an outer region located outside the central region strongly deflects light to the outside, and wherein the first mark and the second mark have a lens function, wherein focal lengths are selected such that a correct pattern occurs only when the distance between the first optical waveguide and the second optical waveguide also takes a specified value;
    detecting a pattern occurring during the illumination after passing the first mark and the second mark at a light detector; and
    changing the position of one of the optical waveguides until the detected pattern matches a specified pattern.

2. The method as claimed in claim 1, wherein writing at least one of the marks is performed in the same material in which the associated hologram is written.

3. The method as claimed in claim 1, wherein writing at least one of the marks is performed in a material different from that in which the associated hologram is written.

4. The method as claimed in claim 1, wherein the marks of the individual optical waveguides are exactly on top of each other when correctly positioned and result in a detectable pattern when illuminated.

5. The method as claimed in claim 1, wherein the marks of the individual optical waveguides lie next to one another when correctly positioned and result in a detectable pattern when illuminated.

6. A stack of optical waveguides produced by:
writing a first hologram and a first mark in a first optical waveguide for a first color;
writing a second hologram and a second mark in a second optical waveguide for a second color, wherein the first color and the second color are not the same;
positioning the first optical waveguide and the second optical waveguide with respect to one another;
illuminating the first mark and the second mark, wherein the marks of the individual optical waveguides are grating structures or holograms that influence the light used during the illumination and are adapted to one another in such a way that a correct alignment is detectable, wherein a central region of the mark allows light to pass while an outer region located outside the central region strongly deflects light to the outside, and wherein the first mark and the second mark have a lens function, wherein focal lengths are selected such that a correct pattern occurs only when the distance between the first optical waveguide and the second optical waveguide also takes a specified value;
detecting a pattern occurring during the illumination after passing the first mark and the second mark at a light detector; and
changing the position of one of the optical waveguides until the detected pattern matches a specified pattern.

7. The stack of optical waveguides as set forth in claim 6, wherein each of the optical waveguides has at least one hologram and at least one mark, and associated marks of the individual optical waveguides are arranged aligned with one another.

8. A head-up display comprising:
a stack of optical waveguides produced by:
writing a first hologram and a first mark in a first optical waveguide for a first color;
writing a second hologram and a second mark in a second optical waveguide for a second color, wherein the first color and the second color are not the same;
positioning the first optical waveguide and the second optical waveguide with respect to one another;
illuminating the first mark and the second mark, wherein the marks of the individual optical waveguides are grating structures or holograms that influence the light used during the illumination and are adapted to one another in such a way that a correct alignment is detectable, wherein a central region of the mark allows light to pass while an outer region located outside the central region strongly deflects light to the outside, and wherein the first mark and the second mark have a lens function, wherein focal lengths are selected such that a correct pattern occurs only when the distance between the first optical waveguide and the second optical waveguide also takes a specified value;
detecting a pattern occurring during the illumination after passing the first mark and the second mark at a light detector; and
changing the position of one of the optical waveguides until the detected pattern matches a specified pattern.

* * * * *